(No Model.)

K. S. HUNT.
STUMP EXTRACTOR.

No. 317,458. Patented May 5, 1885.

Witnesses
Douglas Dyrenforth
A. Curtis Lammond

Inventor
Kinsey S. Hunt
By David Hunt
Atty.

UNITED STATES PATENT OFFICE.

KINSEY S. HUNT, OF NORTH BRANCH, MICHIGAN.

STUMP-EXTRACTOR.

SPECIFICATION forming part of Letters Patent No. 317,458, dated May 5, 1885.

Application filed November 1, 1884. (No model.)

*To all whom it may concern:*

Be it known that I, KINSEY S. HUNT, a citizen of the United States, residing at North Branch, Michigan, have invented new and useful Improvements in Stump-Extractors, of which the following is a specification.

My invention relates to certain new and useful improvements in stump extractors.

The objects of the invention are to produce a device which may be easily moved from place to place, and to provide a simle means for adjusting the position of the operating lever employed in the device, and also to provide simple and effective means of adjusting the positions of the chains, ropes, or the like which may be used to connect the extractor with the stump to be operated upon. With these objects in view my invention consists of a frame of novel construction, upon which is supported a lever connected in a novel manner to the frame upon which it is supported, the said lever being provided with novel means for attachment to the stump to be drawn.

In order that those skilled in the art to which my invention appertains may know how to make and use my invention, I will now proceed to describe the same in connection with the accompanying drawings, in which—

Figure 1:
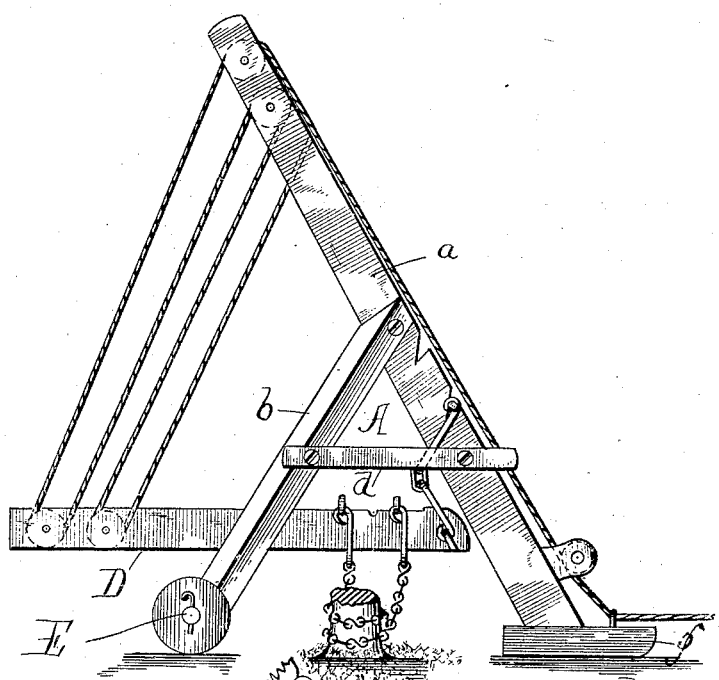
Figure 2:
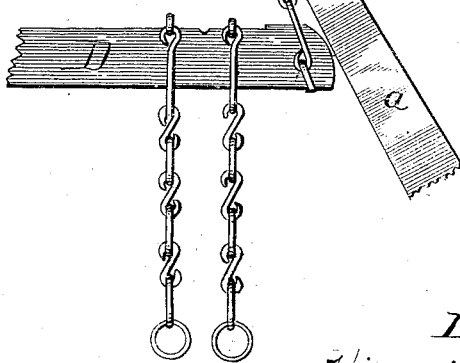

Figure 1 is a perspective view of the device, and Fig. 2 is a detailed view representing the manner of attaching the inner end of the lever to the supporting-frame in order to form a fulcrum upon which the lever works in the operation of the device.

In these drawings, A represents the main supporting-frame of the device, which is preferably in the form of a tripod, for the reason that this form affords the greatest amount of security consistent with perfect simplicity and cheapness. This frame is composed of the beam *a*, which is of a length to extend from the ground to the necessary height of the blocks over which the ropes pass which draw the lever upward when the extractor is operated. The lower end of this beam is supported upon a small platform or foot, *f*, which is provided with any suitable means for attaching a horse when it is desired to move the device. The beam is supported about midway of its height by two inclined beams, *b c*, which are rigidly secured at their upper ends to the beam, and at their lower ends rest upon a transverse bar, *e*, upon the ends of which are mounted wheels, which facilitates movement of the device from place to place.

In order to render the joint between the two standards *b c* more secure, I provide two braces, *d*, which are rigidly secured to the braces *b c* and to the beam A, and thus insure the rigidity of the parts.

D represents the lever, which is made of a piece of metal or wood, preferably the latter, of a strength to withstand the strain imposed upon it, and is attached at one end to the beam A, while the other end is provided with blocks, over which pass ropes or chains extending from the upper end of the beam A, where they pass over similar blocks. By these ropes or chains the outer end is raised, and consequently the ropes or chains which connect the lever to the stump to be extracted is raised. The operating rope or chain extends back and forth between the upper end of the main beam and the outer end of the lever a suitable number of times, in order to give the necessary strength to the connection, and the free end extends down the beam and through a suitable block.

The manner of connecting the inner end of the lever to the frame is shown in Fig. 2. This device employed consists of a clevis secured to the end of the lever by means of a pin passing through the same and connected to a similar clevis which encircles the main beam. The main beam A is provided with a series of notches or indentations, into which the pin-clevis fits, and the height of the inner end of the lever is easily changed by shifting the clevis from one notch to another.

Although I have described and shown a particular form of clevis, it is obvious that any suitable means of securing the end of the lever to the beam which preserves the adjustability of the said lever may be employed to advantage.

The lever D is connected to the stump to be extracted by means of depending chains or ropes, whose upper ends are carried by rings which encircle the lever, and the lever is provided upon its upper side with a series of grooves, in which these rings rest and are retained at any desired distance from the end of the lever.

In the operation of the device the inner end of the lever is placed in the desired position, and the ropes or chains which are connected to the stump are adjusted to their proper positions upon the lever. When these parts are in proper position, the outer end of the operating-lever is raised by means of the rope which connects it to the upper portion of the frame. The ropes attached to the stump being placed near the fulcrum of the operating-lever, any strain imposed upon the outer end of the lever is, of course, greatly multiplied in its effect upon the stump to be raised, and consequently comparatively little power is needed to withdraw an ordinary stump.

Having thus described my invention, what I claim as new, and desire to secure by Letters Patent, is—

1. In a stump-extractor, the supporting-frame having the operating-lever adjustably attached thereto and provided with means, substantially as described, for operating the same.

2. In a stump-extractor, the supporting-frame having secured thereto the operating-lever, the inner end of said lever being vertically adjustable, substantially as described, and means for operating the said lever.

3. In a stump-extractor, the supporting-frame having a vertically-adjustable ring secured thereto, the inner end of the said operating-lever being connected to the said ring, and means for operating the said lever.

4. In a stump-extractor, the main beam A, suitably supported and provided with notches, a ring adapted to rest within one of the said notches, the operating-lever secured to said ring, and means for operating the lever.

5. In a stump-extractor, the supporting-frame, the lever pivotally connected thereto and having depending ropes and chains connected thereto, and longitudinally adjustable thereon means for operating the said lever.

6. In a stump-extractor, the frame consisting of the main beam A, having the supporting-braces mounted upon the cross-bar having wheels, and the lever pivotally connected thereto and provided with means for operating the said lever.

7. In a stump-extractor, the supporting-frame having a vertically-adjustable ring, or its equivalent, having connected thereto the operating-lever, having the depending ropes or chains for attachment to the stump longitudinally adjustable thereon, and means for operating the said lever.

8. In a stump-extractor, the main frame having a pulley or pulleys secured at its upper end, and the operating-lever adjustably attached to said frame and provided with pulleys, and a rope passing over the pulleys upon the upper portion of the frame and end of the operating-lever, substantially as described.

In testimony whereof I have hereunto set my hand in the presence of two subscribing witnesses.

KINSEY S. ✕ HUNT.
his mark.

Witnesses:
D. C. WATTLES,
A. C. LARAWAY.